United States Patent
VanDuyn et al.

(10) Patent No.: US 8,572,651 B2
(45) Date of Patent: Oct. 29, 2013

(54) METHODS AND APPARATUS FOR PRESENTING SUPPLEMENTAL INFORMATION IN AN ELECTRONIC PROGRAMMING GUIDE

(75) Inventors: Luke VanDuyn, Highlands Ranch, CO (US); James Matthew White, Denver, CO (US)

(73) Assignee: EchoStar Technologies, L.L.C., Englewood, CO (US)

( * ) Notice: Subject to any disclaimer, the term of this patent is extended or adjusted under 35 U.S.C. 154(b) by 338 days.

(21) Appl. No.: 12/235,476

(22) Filed: Sep. 22, 2008

(65) Prior Publication Data
US 2010/0077432 A1    Mar. 25, 2010

(51) Int. Cl.
*G06F 3/00*     (2006.01)
*G06F 13/00*    (2006.01)
*H04N 5/445*    (2011.01)

(52) U.S. Cl.
USPC ............... 725/43; 725/37; 725/38; 725/39; 725/40; 725/41; 725/42

(58) Field of Classification Search
USPC .......................................................... 725/43
See application file for complete search history.

(56) References Cited

U.S. PATENT DOCUMENTS

| | | |
|---|---|---|
| 4,450,477 A | 5/1984 | Lovett |
| 4,725,888 A | 2/1988 | Hakamada |
| 4,739,510 A | 4/1988 | Jeffers et al. |
| 4,852,019 A | 7/1989 | Vinberg et al. |
| 4,868,785 A | 9/1989 | Jordan et al. |
| 5,187,776 A | 2/1993 | Yanker |
| 5,260,778 A | 11/1993 | Kauffman et al. |
| 5,428,734 A | 6/1995 | Haynes et al. |
| 5,438,372 A | 8/1995 | Tsumori et al. |
| 5,450,536 A * | 9/1995 | Rosenberg et al. ........... 715/236 |
| 5,453,796 A | 9/1995 | Duffield et al. |
| 5,539,478 A | 7/1996 | Bertram et al. |
| 5,539,479 A | 7/1996 | Bertram |

(Continued)

FOREIGN PATENT DOCUMENTS

| | | |
|---|---|---|
| EP | 1063797 A2 | 12/2000 |
| EP | 1158793 A2 | 11/2001 |
| TW | 200729167 | 1/2007 |
| WO | 0001142 A1 | 1/2000 |
| WO | 0145395 A | 6/2001 |
| WO | 0178054 A1 | 10/2001 |

(Continued)

OTHER PUBLICATIONS

International Searching Authority, European Patent Office, "International Search Report," mailed Dec. 7, 2009; International Application No. PCT/US2009/058457, filed Sep. 25, 2009.

(Continued)

*Primary Examiner* — Jeremy Duffield
(74) *Attorney, Agent, or Firm* — Ingrassia Fisher & Lorenz, P.C.

(57) ABSTRACT

The various embodiments described herein facilitate the display of television guide information to a user simultaneously with supplemental content related to the guide information. An electronic programming guide is initially displayed in first and second portions of a display menu. Responsive to a user selection, the size of the display menu devoted to the electronic programming guide data is modified to free space for the display of supplemental content. Thus, the supplemental content is presented in a first portion of the display menu previously devoted to the electronic programming guide, and the electronic programming guide is simultaneously presented in a second portion of the display menus

14 Claims, 6 Drawing Sheets

(56) References Cited

U.S. PATENT DOCUMENTS

| | | |
|---|---|---|
| 5,545,857 A | 8/1996 | Lee et al. |
| 5,548,340 A | 8/1996 | Bertram |
| 5,559,961 A | 9/1996 | Blonder |
| 5,585,866 A | 12/1996 | Miller et al. |
| 5,589,893 A | 12/1996 | Gaughan et al. |
| 5,594,469 A | 1/1997 | Freeman et al. |
| 5,594,509 A | 1/1997 | Florin et al. |
| 5,602,597 A | 2/1997 | Bertram |
| 5,604,544 A | 2/1997 | Bertram |
| 5,606,374 A | 2/1997 | Bertram |
| 5,650,827 A | 7/1997 | Tsumori et al. |
| 5,652,630 A | 7/1997 | Bertram et al. |
| 5,659,369 A | 8/1997 | Imaiida |
| 5,677,708 A | 10/1997 | Matthews, III et al. |
| 5,682,489 A | 10/1997 | Harrow et al. |
| 5,721,815 A | 2/1998 | Ottesen et al. |
| 5,721,878 A | 2/1998 | Ottesen et al. |
| 5,742,286 A | 4/1998 | Kung et al. |
| 5,751,883 A | 5/1998 | Ottesen et al. |
| 5,754,258 A | 5/1998 | Hanaya et al. |
| 5,767,840 A | 6/1998 | Selker |
| 5,768,158 A | 6/1998 | Adler et al. |
| 5,774,186 A | 6/1998 | Brodsky et al. |
| 5,786,805 A | 7/1998 | Barry |
| 5,801,747 A | 9/1998 | Bedard |
| 5,805,235 A | 9/1998 | Bedard |
| 5,809,265 A | 9/1998 | Blair et al. |
| 5,815,216 A | 9/1998 | Suh |
| 5,825,361 A | 10/1998 | Rubin et al. |
| 5,831,591 A | 11/1998 | Suh |
| 5,831,607 A | 11/1998 | Brooks |
| 5,867,162 A | 2/1999 | O'Leary et al. |
| 5,874,953 A | 2/1999 | Webster et al. |
| 5,898,431 A | 4/1999 | Webster et al. |
| 5,905,496 A | 5/1999 | Lau et al. |
| 5,917,488 A | 6/1999 | Anderson et al. |
| 5,917,489 A | 6/1999 | Thurlow et al. |
| 5,936,623 A | 8/1999 | Amro |
| 5,940,073 A | 8/1999 | Klosterman et al. |
| 5,949,417 A | 9/1999 | Calder |
| 5,956,025 A | 9/1999 | Goulden et al. |
| 5,966,121 A | 10/1999 | Hubbell et al. |
| 5,978,043 A | 11/1999 | Blonstein et al. |
| 5,999,228 A | 12/1999 | Matsuura et al. |
| 6,005,565 A | 12/1999 | Legall |
| 6,008,735 A | 12/1999 | Chiloyan et al. |
| 6,008,860 A | 12/1999 | Patton et al. |
| 6,018,342 A | 1/2000 | Bristor |
| 6,020,930 A | 2/2000 | Legrand |
| 6,052,121 A | 4/2000 | Webster et al. |
| 6,057,841 A | 5/2000 | Thurlow et al. |
| 6,064,376 A | 5/2000 | Berezowski et al. |
| 6,078,308 A | 6/2000 | Rosenberg et al. |
| 6,088,029 A | 7/2000 | Guiberson et al. |
| 6,118,442 A | 9/2000 | Tanigawa |
| 6,118,498 A | 9/2000 | Reitmeier |
| 6,125,374 A | 9/2000 | Terry et al. |
| 6,141,003 A | 10/2000 | Chor et al. |
| 6,147,714 A | 11/2000 | Terasawa et al. |
| 6,173,112 B1 | 1/2001 | Gruse et al. |
| 6,191,773 B1 | 2/2001 | Maruno et al. |
| 6,208,341 B1 | 3/2001 | van Ee et al. |
| 6,208,804 B1 | 3/2001 | Ottesen et al. |
| 6,215,417 B1 | 4/2001 | Krass et al. |
| 6,233,389 B1 | 5/2001 | Barton et al. |
| 6,266,098 B1 | 7/2001 | Cove et al. |
| 6,281,940 B1 | 8/2001 | Sciammarella |
| 6,334,217 B1 | 12/2001 | Kim |
| 6,493,036 B1 | 12/2002 | Fernandez |
| 6,498,628 B2 | 12/2002 | Iwamura |
| 6,526,577 B1 | 2/2003 | Knudson et al. |
| 6,529,685 B2 | 3/2003 | Ottesen et al. |
| 6,556,252 B1 | 4/2003 | Kim |
| 6,650,248 B1 | 11/2003 | O'Donnell et al. |
| 6,678,009 B2 | 1/2004 | Kahn |
| 6,697,123 B2 | 2/2004 | Janevski et al. |
| 6,750,803 B2 | 6/2004 | Yates et al. |
| 6,750,887 B1 * | 6/2004 | Kellerman et al. ........... 715/788 |
| 6,774,914 B1 | 8/2004 | Benayoun |
| 6,804,824 B1 | 10/2004 | Potrebic et al. |
| 6,816,442 B1 | 11/2004 | Heiman et al. |
| 6,822,698 B2 | 11/2004 | Clapper |
| 6,882,712 B1 | 4/2005 | Iggulden et al. |
| 6,934,963 B1 * | 8/2005 | Reynolds et al. ............... 725/39 |
| 6,943,845 B2 | 9/2005 | Mizutome et al. |
| 7,046,161 B2 | 5/2006 | Hayes |
| 7,061,544 B1 | 6/2006 | Nonomura et al. |
| 7,148,909 B2 | 12/2006 | Yui et al. |
| 7,171,622 B2 | 1/2007 | Bhogal |
| 7,196,733 B2 | 3/2007 | Aratani et al. |
| 7,206,029 B2 | 4/2007 | Cohen-Solal |
| 7,225,456 B2 | 5/2007 | Kitsukawa et al. |
| 7,231,603 B2 | 6/2007 | Matsumoto |
| 7,268,830 B2 | 9/2007 | Lee |
| 7,370,284 B2 * | 5/2008 | Andrea et al. ................ 715/788 |
| 7,420,620 B2 | 9/2008 | Habas et al. |
| 7,434,246 B2 | 10/2008 | Florence |
| 7,440,036 B2 | 10/2008 | Onomatsu et al. |
| 7,584,492 B2 | 9/2009 | Terakado et al. |
| 7,600,201 B2 | 10/2009 | Endler et al. |
| 7,620,966 B2 | 11/2009 | Kitamori |
| 7,636,131 B2 | 12/2009 | Hsieh et al. |
| 7,707,599 B1 | 4/2010 | Groff et al. |
| 7,746,332 B2 | 6/2010 | Le Leannec et al. |
| 7,876,382 B2 | 1/2011 | Imaizumi |
| 7,880,813 B2 | 2/2011 | Nakamura et al. |
| 8,001,566 B2 * | 8/2011 | Jang ............................... 725/39 |
| 8,005,826 B1 * | 8/2011 | Sahami et al. .................. 725/52 |
| 8,239,784 B2 | 8/2012 | Hotelling et al. |
| 2001/0011953 A1 | 8/2001 | Shintani et al. |
| 2001/0017672 A1 | 8/2001 | Verhaeghe |
| 2002/0054062 A1 | 5/2002 | Gerba et al. |
| 2002/0057382 A1 | 5/2002 | Yui |
| 2002/0059599 A1 | 5/2002 | Schein et al. |
| 2002/0060754 A1 | 5/2002 | Takeuchi |
| 2002/0070957 A1 | 6/2002 | Trajkovic et al. |
| 2002/0075333 A1 | 6/2002 | Dutta et al. |
| 2002/0075407 A1 | 6/2002 | Cohen-Solal |
| 2002/0097229 A1 | 7/2002 | Rose et al. |
| 2002/0122027 A1 * | 9/2002 | Kim ............................... 345/167 |
| 2002/0122079 A1 | 9/2002 | Kamen et al. |
| 2002/0129366 A1 | 9/2002 | Schein et al. |
| 2002/0178446 A1 * | 11/2002 | Sie et al. ......................... 725/32 |
| 2002/0191954 A1 | 12/2002 | Beach |
| 2003/0001908 A1 | 1/2003 | Cohen-solal |
| 2003/0005443 A1 | 1/2003 | Axelsson et al. |
| 2003/0005445 A1 | 1/2003 | Schein et al. |
| 2003/0018973 A1 | 1/2003 | Thompson |
| 2003/0025716 A1 | 2/2003 | Colavin |
| 2003/0066079 A1 | 4/2003 | Suga |
| 2003/0086694 A1 | 5/2003 | Davidsson |
| 2003/0115589 A1 | 6/2003 | D'Souza et al. |
| 2003/0126607 A1 | 7/2003 | Phillips et al. |
| 2003/0131356 A1 | 7/2003 | Proehl et al. |
| 2003/0191947 A1 | 10/2003 | Stubblefield et al. |
| 2003/0193426 A1 | 10/2003 | Vidal |
| 2003/0208751 A1 | 11/2003 | Kim et al. |
| 2004/0041723 A1 | 3/2004 | Shibamiya et al. |
| 2004/0070593 A1 | 4/2004 | Neely et al. |
| 2004/0107439 A1 | 6/2004 | Hassell et al. |
| 2004/0111744 A1 | 6/2004 | Bae et al. |
| 2004/0168191 A1 | 8/2004 | Jerding et al. |
| 2004/0172651 A1 | 9/2004 | Wasilewski et al. |
| 2004/0201780 A1 | 10/2004 | Kim |
| 2004/0218905 A1 | 11/2004 | Green et al. |
| 2004/0230843 A1 | 11/2004 | Jansen |
| 2004/0255336 A1 | 12/2004 | Logan et al. |
| 2005/0002649 A1 | 1/2005 | Boyle et al. |
| 2005/0010949 A1 | 1/2005 | Ward et al. |
| 2005/0015803 A1 * | 1/2005 | Macrae et al. ................... 725/41 |
| 2005/0076361 A1 | 4/2005 | Choi et al. |
| 2005/0084233 A1 | 4/2005 | Fujii et al. |
| 2005/0128366 A1 | 6/2005 | Cha |
| 2005/0188402 A1 | 8/2005 | de Andrade et al. |

(56) References Cited

U.S. PATENT DOCUMENTS

| | | |
|---|---|---|
| 2005/0190280 A1 | 9/2005 | Haas et al. |
| 2005/0251826 A1 | 11/2005 | Orr |
| 2005/0268100 A1 | 12/2005 | Gasparini et al. |
| 2006/0026639 A1 | 2/2006 | Potrebic et al. |
| 2006/0037047 A1 | 2/2006 | DeYonker et al. |
| 2006/0051058 A1 | 3/2006 | Rudolph et al. |
| 2006/0061688 A1 | 3/2006 | Choi |
| 2006/0084409 A1 | 4/2006 | Ghadiali |
| 2006/0095401 A1 | 5/2006 | Krikorian et al. |
| 2006/0236342 A1 | 10/2006 | Kunkel et al. |
| 2007/0019111 A1 | 1/2007 | Won |
| 2007/0039019 A1 | 2/2007 | Collier |
| 2007/0039020 A1* | 2/2007 | Cansler et al. ............... 725/37 |
| 2007/0061724 A1 | 3/2007 | Slothouber et al. |
| 2007/0074254 A1 | 3/2007 | Sloo |
| 2007/0079334 A1* | 4/2007 | Silver ........................... 725/58 |
| 2007/0115391 A1 | 5/2007 | Anderson |
| 2007/0130607 A1 | 6/2007 | Thissen et al. |
| 2007/0192791 A1 | 8/2007 | Sullivan et al. |
| 2007/0195197 A1 | 8/2007 | Seong et al. |
| 2007/0199022 A1 | 8/2007 | Moshiri et al. |
| 2007/0266397 A1 | 11/2007 | Lin |
| 2007/0277224 A1 | 11/2007 | Osborn et al. |
| 2008/0010518 A1 | 1/2008 | Jiang et al. |
| 2008/0024682 A1 | 1/2008 | Chen |
| 2008/0034314 A1 | 2/2008 | Louch et al. |
| 2008/0052245 A1 | 2/2008 | Love |
| 2008/0066102 A1* | 3/2008 | Abraham et al. ............ 725/37 |
| 2008/0074550 A1 | 3/2008 | Park |
| 2008/0088495 A1 | 4/2008 | Kawakita |
| 2008/0129886 A1 | 6/2008 | Ishihara |
| 2008/0147803 A1 | 6/2008 | Krzyzanowski et al. |
| 2008/0184324 A1 | 7/2008 | Yun et al. |
| 2008/0222523 A1 | 9/2008 | Fox et al. |
| 2008/0229254 A1 | 9/2008 | Warner |
| 2008/0231762 A1 | 9/2008 | Hardacker et al. |
| 2008/0235735 A1 | 9/2008 | Wroblewski |
| 2008/0263595 A1* | 10/2008 | Sumiyoshi et al. ......... 725/39 |
| 2009/0007209 A1 | 1/2009 | Kawai |
| 2009/0031335 A1 | 1/2009 | Hendricks et al. |
| 2009/0031343 A1 | 1/2009 | Sharkey |
| 2009/0070815 A1 | 3/2009 | Barrett et al. |
| 2009/0141024 A1 | 6/2009 | Lee et al. |
| 2009/0241145 A1 | 9/2009 | Sharma |
| 2010/0050199 A1 | 2/2010 | Kennedy |
| 2010/0071004 A1 | 3/2010 | Wightman |
| 2010/0074592 A1 | 3/2010 | Taxier et al. |
| 2010/0079671 A1 | 4/2010 | VanDuyn et al. |
| 2010/0079681 A1 | 4/2010 | Coburn et al. |
| 2010/0083309 A1 | 4/2010 | White et al. |
| 2010/0083310 A1 | 4/2010 | VanDuyn et al. |
| 2010/0083312 A1 | 4/2010 | White et al. |
| 2010/0083313 A1 | 4/2010 | White et al. |
| 2010/0083315 A1 | 4/2010 | White et al. |
| 2010/0083319 A1 | 4/2010 | Martch et al. |
| 2010/0100909 A1 | 4/2010 | Arsenault et al. |
| 2010/0115550 A1 | 5/2010 | Minnick et al. |
| 2010/0169958 A1 | 7/2010 | Werner et al. |

FOREIGN PATENT DOCUMENTS

| | | |
|---|---|---|
| WO | 0178383 A2 | 10/2001 |
| WO | 02087243 A | 10/2002 |
| WO | 03043320 A2 | 5/2003 |
| WO | 2006119269 A2 | 11/2006 |
| WO | 2006127211 A2 | 11/2006 |
| WO | 2007015047 A2 | 2/2007 |
| WO | 2008013350 A2 | 1/2008 |

OTHER PUBLICATIONS

International Searching Authority, European Patent Office, "International Search Report and Written Opinion," mailed Dec. 18, 2009; International Application No. PCT/US2009/058456, filed Sep. 25, 2009.

International Searching Authority, European Patent Office, "International Search Report and Written Opinion," mailed Dec. 21, 2009; International Application No. PCT/US2009/058454 filed Sep. 25, 2009.

Anonymous "ZigBee," Wikipedia, the Free Encyclopedia [online], Sep. 26, 2008, XP002558439; retrieved from the Internet: <URL:http://en.wikipedia.org/w/index.php?title=ZigBee &oldid=241085798> [retrieved on Dec. 2, 2009].

Nintendo, "Wii Operations Manual System Setup," 2007.

Wikipedia, the free encyclopedia, "Dashboard (Software," Retrieved from the Internet on Oct. 6, 2008, http://en.wikipedia.org/w/index. php?title=Dashboard_(software)&printable=yes.

International Searching Authority, European Patent Office, Annex to Form PCT/ISA/206, Communication Relating to the Results of the Partial International Search, mailed Nov. 16, 2009; International Application No. PCT/US2009/057825, filed Sep. 22, 2009.

International Searching Authority, European Patent Office, "International Search Report," mailed Feb. 4, 2010; International Application No. PCT/US2009/058937, filed Sep. 30, 2009.

International Searching Authority, European Patent Office, "International Search Report," mailed Feb. 16, 2010; International Application No. PCT/US2009/057582, filed Sep. 18, 2009.

Wightman, Robert Edward "Methods and Apparatus for Providing Multiple Channel Recall on a Television Receiver," U.S. Appl. No. 12/233,274, filed Sep. 18, 2008.

White, James Matthew et al. "Systems and Methods for Configuration of a Remote Control Device," U.S. Appl. No. 12/241,550, filed Sep. 30, 2008.

White, James Matthew et al. "Systems and Methods for Graphical control of User Interface Features Provided by a Television Receiver," U.S. Appl. No. 12/241,556, filed Sep. 30, 2008.

Vanduyn, Luke et al. "Systems and Methods for Graphical Control of Picture-In-Picture Windows," U.S. Appl. No. 12/241,571, filed Sep. 30, 2008.

White, James Matthew et al. "Systems and Methods for Providing Customer Service Features Via a Graphical User Interface in a Television Receiver," U.S. Appl. No. 12/241,580, filed Sep. 30, 2008.

Martch, Henry Gregg "Systems and Methods for Automatic Configuration of a Remote Control Device," U.S. Appl. No. 12/242,089, filed Sep. 30, 2008.

White, James Matthew et al. "Systems and Methods for Graphical Control of User Interface Features in a Television Receiver," U.S. Appl. No. 12/241,599, filed Sep. 30, 2008.

Coburn, Matthew et al. "Systems and Methods for Graphical Control of Symbol-Based Features in a Television Receiver," U.S. Appl. No. 12/241,604, filed Sep. 30, 2008.

White, James Matthew et al. "Systems and Methods for Graphical Adjustment of an Electronic Program Guide," U.S. Appl. No. 12/241,608, filed Sep. 30, 2008.

Minnick, Danny Jean et al., "Graphical Interface Navigation Based on Image Element Proximity," U.S. Appl. No. 12/609,860, filed Oct. 30, 2009.

Vanduyn, Luke et al. "Methods and Apparatus for Providing Multiple Channel Recall on a Television Receiver," U.S. Appl. No. 12/242,587, filed Sep. 30, 2008.

Taxier, Karen Michelle et al. "Methods and Apparatus for Visually Displaying Recording Timer Information," U.S. Appl. No. 12/235,464, filed Sep. 22, 2008.

Martch, Henry Gregg et al. "Methods and Apparatus for Locating Content in an Electronic Programming Guide," U.S. Appl. No. 12/242,614, filed Oct. 17, 2008.

Taxier, Karen Michelle et al. "Apparatus and Methods for Dynamic Pictorial Image Authentication," U.S. Appl. No. 12/236,430, filed Sep. 23, 2008.

USPTO "Non-Final Office Action" mailed Nov. 24, 2010; U.S. Appl. No. 12/242,587, filed Sep. 30, 2008.

USPTO "Non-Final Office Action" mailed Jan. 12, 2011; U.S. Appl. No. 12/241,580, filed Sep. 30, 2008.

(56) References Cited

OTHER PUBLICATIONS

USPTO "Non-Final Office Action" mailed Jan. 28, 2011; U.S. Appl. No. 12/236,430, filed Sep. 23, 2008.
USPTO "Non-Final office Action" mailed Feb. 4, 2011; U.S. Appl. No. 12/241,599, filed Sep. 30, 2008.
USPTO "Non-Final Office Action" mailed Feb. 9, 2011; U.S. Appl. No. 12/241,608, filed Sep. 30, 2008.
USPTO "Non-Final Office Action" mailed Mar. 31, 2011; U.S. Appl. No. 12/241,556, filed Sep. 30, 2008.
USPTO "Non-Final Office Action" mailed Dec. 6, 2011; U.S. Appl. No. 12/241,580, filed Sep. 30, 2008.
USPTO "Final Office Action" mailed Dec. 7, 2011; U.S. Appl. No. 12/241,599, filed Sep. 30, 2008.
USPTO "Final Office Action" mailed Jan. 20, 2012; U.S. Appl. No. 121241,604, filed Sep. 30, 2008.
USPTO "Non-Final Office Action" mailed Mar. 7, 2012; U.S. Appl. No. 12/235,464, filed Sep. 22, 2008.
USPTO "Non-Final Office Action" mailed Mar. 22, 2012; U.S. Appl. No. 12/241,556, filed Sep. 30, 2008.
The International Bureau of WIPO "International Preliminary Report on Patentability" mailed Apr. 14, 2011; International Appln. No. PCT/US2009/058236, filed Sep. 24, 2009.
USPTO "Final Office Action" mailed May 13, 2011; U.S. Appl. No. 12/242,587, filed Sep. 30, 2008.
European Patent Office, International Searching Authority, "International Search Report" mailed Nov. 10, 2009; International Appln. No. PCT/EP2009/061499.
USPTO "Non-Final Office Action" mailed Jan. 31, 2011; U.S. Appl. No. 12/233,274, filed Sep. 18, 2008.
USPTO "Non-Final Office Action" mailed Jul. 6, 2011; U.S. Appl. No. 12/241,571, filed Sep. 30, 2008.
USPTO "Non-Final Office Action" mailed Jul. 12, 2011; U.S. Appl. No. 12/241,604, filed Sep. 30, 2008.
USPTO "Final Office Action" mailed Jun. 23, 2011; U.S. Appl. No. 12/241,580, filed Sep. 30, 2008.
USPTO "Final Office Action" mailed Jul. 28, 2011; U.S. Appl. No. 12/241,608, filed Sep. 30, 2008.
USPTO "Final Office Action" mailed Aug. 18, 2011; U.S. Appl. No. 12/233,274, filed Sep. 18, 2008.
United States Patent and Trademark Office "Final Office Action" mailed Aug. 26, 2011, for U.S. Appl. No. 12/241,599, filed Sep. 30, 2008.
United States Patent and Trademark Office "Final Office Action" mailed Oct. 5, 2011, for U.S. Appl. No. 12/241,556, filed Sep. 30, 2008.
USPTO "Final Office Action" mailed Oct. 21, 2011; U.S. Appl. No. 12/241,571, filed Sep. 30, 2008.
USPTO "Non-Final Office Action" mailed Nov. 23, 2011; U.S. Appl. No. 12/242,614, filed Sep. 30, 2008.
USPTO "Final Office Action" mailed Apr. 25, 2012; U.S. Appl. No. 12/242,614, filed Sep. 30, 2008.
United States Patent and Trademark Office, Office Action for U.S. Appl. No. 12/242,587, dated Jun. 5, 2012.
USPTO "Non-Final Office Action" mailed Apr. 17, 2012; U.S. Appl. No. 12/241,608, filed Sep. 30, 2008.
USPTO "Final Office Action" mailed Aug. 8, 2012 for U.S. Appl. No. 12/241,556, filed Sep. 30, 2008.
USPTO "Non-Final Office Action" mailed Jun. 28, 2012 for U.S. Appl. No. 12/241,571, filed Sep. 30, 2008.
USPTO "Non-Final Office Action" mailed Jul. 26, 2012 for U.S. Appl. No. 12/609,860, filed Oct. 30, 2009.
USPTO "Final Office Action" mailed Aug. 2, 2012 for U.S. Appl. No. 12/241,599, filed Sep. 30, 2008.
USPTO "Final Office Action" mailed Jul. 17, 2012 for U.S. Appl. No. 12/241,580, filed Sep. 30, 2008.
USPTO "Final Office Action" mailed Aug. 1, 2012 for U.S. Appl. No. 12/241,608, filed Sep. 30, 2008.
USPTO "Final Office Action" mailed Sep. 14, 2012 for U.S. Appl. No. 12/242,587, filed Sep. 30, 2008.
Intellectual Property Office "Office Action" issued Oct. 25, 2012 for Taiwan Patent Appln. No. 098127906.
USPTO "Final Office Action" mailed Oct. 9, 2012 for U.S. Appl. No. 12/235,464, filed Sep. 22, 2008.
Ntellectual Property Office "Office Action" issued Oct. 30, 2012 for Taiwan Patent Appln. No. 098127902.
USPTO "Notice of Allowance" mailed Nov. 6, 2012 for U.S. Appl. No. 12/241,599, filed Sep. 30, 2008.
USPTO "Final Office Action" mailed Nov. 13, 2012 for U.S. Appl. No. 12/609,860, filed Oct. 30, 2009.
USPTO "Final Office Action" mailed Nov. 13, 2012 for U.S. Appl. No. 12/241,571, filed Sep. 30, 2008.
USPTO "Non'Final Office Action" mailed Nov. 15, 2012 for U.S. Appl. No. 12/241,608, filed Sep. 30, 2008.
USPTO "Non-Final Office Action" mailed Dec. 5, 2012 for U.S. Appl. No. 12/241,556, filed Sep. 30, 2008.
USPTO "Final Office Action" mailed Jan. 23, 2013 for U.S. Appl. No. 12/241,604, filed Sep. 30, 2008.
USPTO, "Notice of Allowance and Fee(s) Due" mailed May 7, 2013 for U.S. Appl. No. 12/241,608, filed Sep. 30, 2008.

* cited by examiner

METHODS AND APPARATUS FOR PRESENTING SUPPLEMENTAL INFORMATION IN AN ELECTRONIC PROGRAMMING GUIDE

BACKGROUND

Electronic program guides are utilized in association with televisions and television receivers to allow users to locate programs of interest for viewing and/or recording. Typically, program information is presented in a grid format. Time slots are arranged along a horizontal axis of the electronic programming guide and channels are arranged along a vertical axis of the electronic programming guide. The user may scroll along both the horizontal and vertical axes of the electronic programming guide to locate programs of interest for viewing and/or recording. A problem with grid based electronic programming guides is that limited space is available for presenting additional information related to the programming guide data, and thus, users are deprived of useful information that could be presented in association with the electronic programming guide data.

BRIEF DESCRIPTION OF THE DRAWINGS

The same number represents the same element or same type of element in all drawings.

DETAILED DESCRIPTION

The various embodiments described herein generally provide apparatus, systems and methods which facilitate the display of television guide information. More particularly, responsive to user selection of particular portions of an electronic programming guide, supplemental content related to the guide information may be displayed to a user. An electronic programming guide is initially displayed in first and second portions of a display menu. Responsive to a user selection, the size of the display menu devoted to the electronic programming guide data is modified to free space for the display of supplemental content. Thus, the supplemental content is presented in a first portion of the display menu previously devoted to the electronic programming guide. The electronic programming guide is simultaneously presented in a second portion of the display menu. In other words, the electronic programming guide data is shrunk such that supplemental content may be presented simultaneously with the electronic programming guide data in the space originally occupied by the electronic programming guide data. In short, the various embodiments described herein generally provide apparatus, systems and methods for visually displaying electronic programming guide data and supplemental content related to the electronic programming guide simultaneously responsive to user input.

Figure 1:
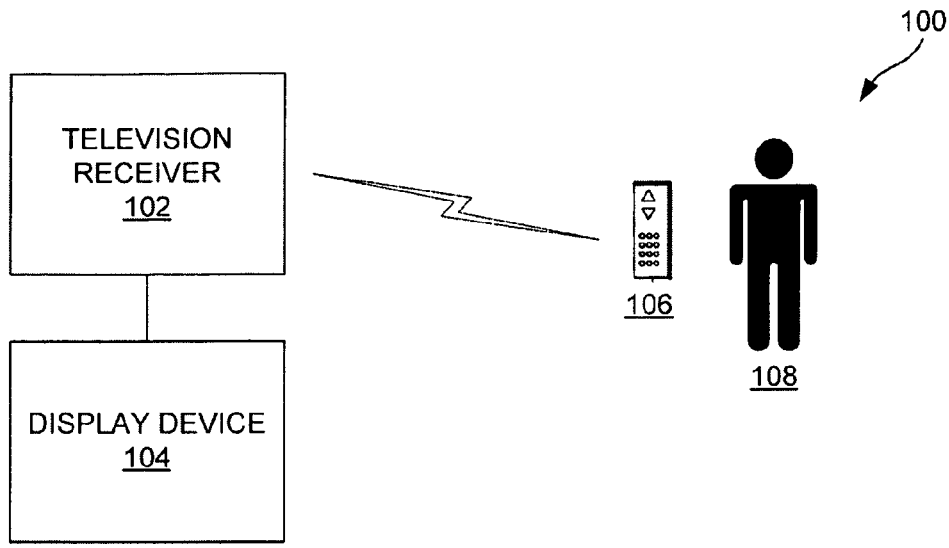
FIG. 1 illustrates an embodiment of an entertainment system.

FIG. 1 illustrates an embodiment of an entertainment system 100. The entertainment system 100 presents content to a user 108. In at least one embodiment, the content presented to the user 108 includes an audio/video stream, such as a television program, movie or other recorded content and the like. The entertainment system 100 includes a television receiver 102, a display device 104 and a remote control 106. Each of these components is discussed in greater detail below. The entertainment system 100 may include other devices, components or elements not illustrated for the sake of brevity.

The television receiver 102 is operable to receive content from one or more content sources (not shown in FIG. 1) and output the received content for presentation by the display device 104. More particularly, the television receiver 102 is operable to receive, demodulate and output a television signal from a programming source, such as a satellite, cable, internet, terrestrial or other type of television transmission signal. The television receiver 102 may receive an audio/video stream in any format (e.g., analog or digital format). Likewise, the television receiver 102 may output the audio/video stream for presentation by the display device 104 in any type of format. In at least one embodiment, the television receiver 102 is a set-top box (e.g., a satellite or cable television receiver or converter box) or other similar device that processes and provides one or more audio and/or video output streams to the display device 104 for presentation to the user 108. The television receiver 102 may be further configured to output for display menus and other information that allow a user 108 to control the selection and output of content by the television receiver 102. For example, as described in further detail below, the television receiver 102 may output electronic programming guide menus for review by the user 108. In at least one embodiment, the television receiver 102 includes an integrated digital video recorder (DVR) operable to record video signals, corresponding with particular television programs, for subsequent viewing by tile user 108.

The display device 104 may comprise any type of device capable of receiving and outputting a video signal in any format. Exemplary embodiments of the display device 104 include a television, a computer monitor, a liquid crystal display (LCD) screen, a touch screen and a projector. The display device 104 and the television receiver 102 may be communicatively coupled through any type of wired or wireless interface. For example, the display device 104 may be communicatively coupled to the television receiver 102 through a coaxial cable, component or composite video cables, an HDMI cable, a VGA or SVGA cable, a Bluetooth or WiFi wireless connection or the like. In at least one embodiment, the television receiver 102 and the display device 104 may be integrated as a device combining the functionality of a display device and a television receiver.

The remote control 106 may comprise any system or apparatus configured to remotely control the output of content by the television receiver 102. The remote control 106 may minimally include a transmitter, an input device (e.g., a keypad) and a processor for controlling the operation of the remote control 106. The remote control 106 may communicate commands to the television receiver 102 requesting to playback content, temporally move through content (e.g., fast-forward or reverse), adjust the volume access electronic programming guides, set or edit recording timers and the like. In some embodiments, the remote control 106 may additionally be configured to remotely control the display device 104. The remote control 106 may communicate with the television receiver 102 and/or the display device 104 through any type of wireless communication medium, such as infrared (IR) signals or radio-frequency (RF) signals.

The remote control 106 may include any type of man-machine interface for receiving input from the user 108. For example, the remote control 106 may include buttons for receiving input from the user 108. In at least one embodiment, the remote control 106 includes a touch pad for receiving input from the user 108. The remote control 106 may further include a trigger, utilized in association with the touch pad, for allowing the user 108 to input information associated with the menus displayed on-screen.

Figure 2:
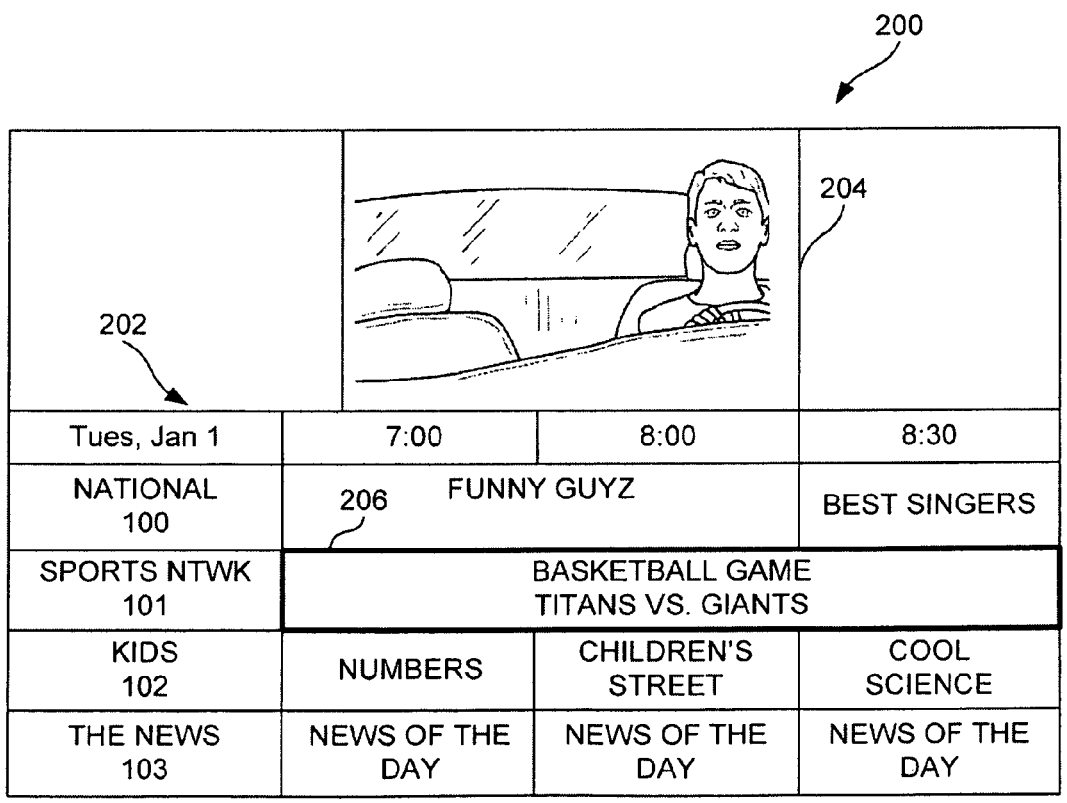
FIG. 2 illustrates a screenshot of an embodiment of a display menu outputted by the television receiver of FIG. 1.

To locate television programs available for viewing, the user 108 utilizes the remote control 106 to request access to an electronic programming guide of the television receiver 102. FIG. 2 illustrates a screenshot of an embodiment of a display menu 200 outputted by the television receiver 102 of FIG. 1. The display menu 200 includes an electronic programming guide 202 and a video output 204.

The electronic programming guide 202 graphically displays television programs for multiple channels and time slots in a grid format. In the illustrated embodiment, time slots are arranged along a horizontal axis of the electronic programming guide 202 and channels are arranged along a vertical axis of the electronic programming guide 202. The user 108 may scroll along both the horizontal and vertical axes of the electronic programming guide to locate programs of interest for recording. The user 108 may then provide input to the television receiver 102, via the remote control 106, requesting to view and/or record particular programs listed in the electronic programming guide 202. It is to be appreciated that other formats of electronic programming guides 202 may be utilized in accordance with the teachings described herein. For example, time slots may be arranged along the vertical axis and channels may be arranged along the horizontal axis of an electronic programming guide.

In the illustrated embodiment of FIG. 2, the electronic programming guide 202 is arranged in the bottom-n region of the display menu 200. The display menu 200 may optionally include the video output 204. The video output 204 displays presently viewed video content, such as a live television program or recorded content. However, the video output 204 may be omitted and the electronic programming guide 202 may be arranged to occupy a larger region of the display menu 200. For example, the electronic programming guide 202 may be arranged to cover the full region of the display menu 200 or any selected portion of the display menu 200.

As the user 108 scrolls through the electronic program guide 202, particular cells of the grid, such as a cell corresponding with a particular channel or a cell corresponding with a particular television program, may be selected by the user 108. For example, the user 108 may utilize arrow keys and an enter button of the remote control 106 to highlight and select the cell 206 of the grid corresponding with the Basketball Game television program. Responsive to the user selection, the television receiver 102 identifies supplemental content for presentation in association with the electronic programming guide 202.

Figure 3:
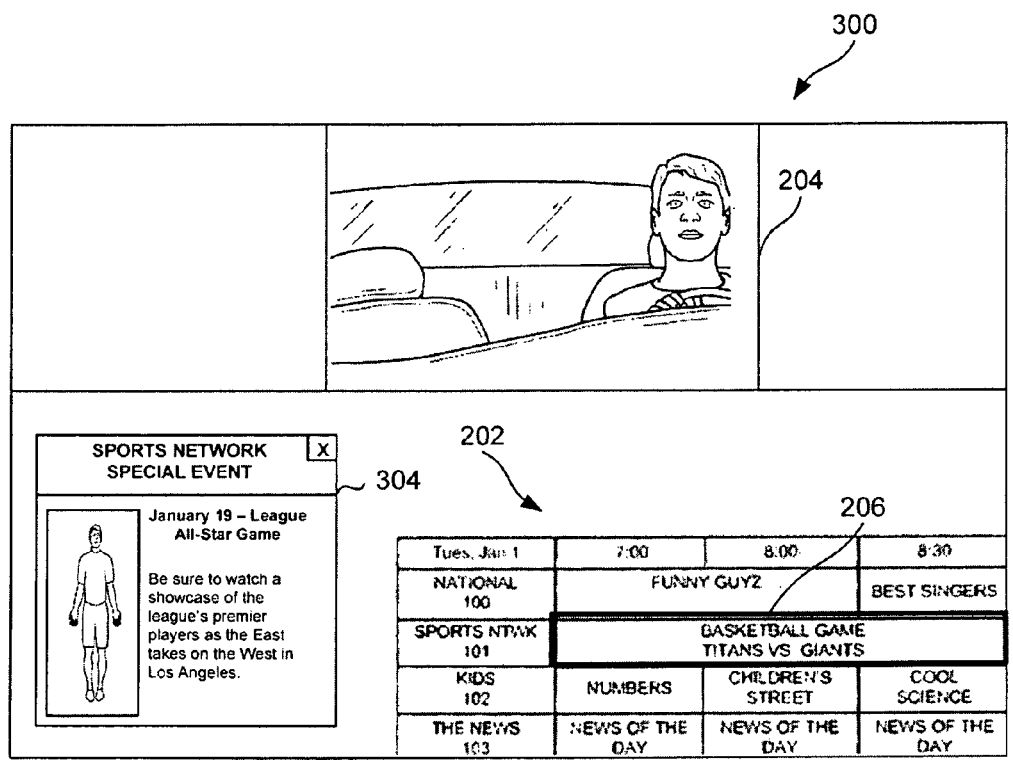
FIG. 3 illustrates a screenshot of another embodiment of a display menu outputted by the television receiver of FIG. 1.

In at least one embodiment, the television receiver 102 shrinks the size of the electronic programming guide 202 to accommodate the display of the supplemental content. FIG. 3 illustrates a screenshot of another embodiment of a display menu 300 outputted by the television receiver 102 of FIG. 1. The display menu 300 is similar to the display menu 200 of FIG. 2. The display menu 300 includes the video output 204, the electronic programming guide 202 and the supplemental content 304.

The electronic programming guide 202 is smaller in FIG. 3 than in FIG. 2. In the illustrated embodiment, the electronic programming guide 202 has been moved over to the right of the display menu 300 to accommodate the display of the supplemental content 304. The user 108 views the supplemental content 304 illustrated in the display menu 300 and may then request to exit the supplemental content 304, returning to the display menu 200 of FIG. 2. In other words, the television receiver 102 returns the electronic programming guide 202 to its original size as illustrated in FIG. 2.

In some embodiments, the supplemental content 304 displayed by the television receiver 102 may be identified based on particular regions of the electronic programming guide 202 selected by the user 108. For example, the supplemental content 304 may be identified based on characteristics of the television channel and/or television program selected in the electronic programming guide 202 by the user 108. As illustrated in FIG. 3, the user 108 selects the cell 206 related to the Basketball Game television program. The supplemental content 304 displayed in display menu 300 provides information regarding an upcoming event for the selected channel. More particularly, the supplemental content 304 provides information related to an upcoming basketball all-star game. Thus, the supplemental content 304 is identified by the television receiver 102 based on both characteristics of the channel and the television program.

In other embodiments, the supplemental content 304 may be identified by the television receiver 104 based on either of the television program or the particular channel selected. For example, the supplemental content 304 may be information regarding a football game to be broadcast on the Sports Network. Likewise, the supplemental content 304 may advertise basketball tickets for one of the teams playing in the Basketball Game, and thus, may have nothing to do with the selected channel.

In at least one embodiment, the supplemental content 304 may allow the user 108 to set a recording timer for an advertised television event. For example, as illustrated in FIG. 3, the supplemental content 304 comprises an advertisement for the upcoming Basketball All-Star Game on the Sports Network channel. Similarly, the supplemental content 304 may include an advertisement for an upcoming hockey game on a Sports Network-2 channel. Thus, the supplemental content 304 may include means for a user to set a recording timer for the event.

Figure 4:
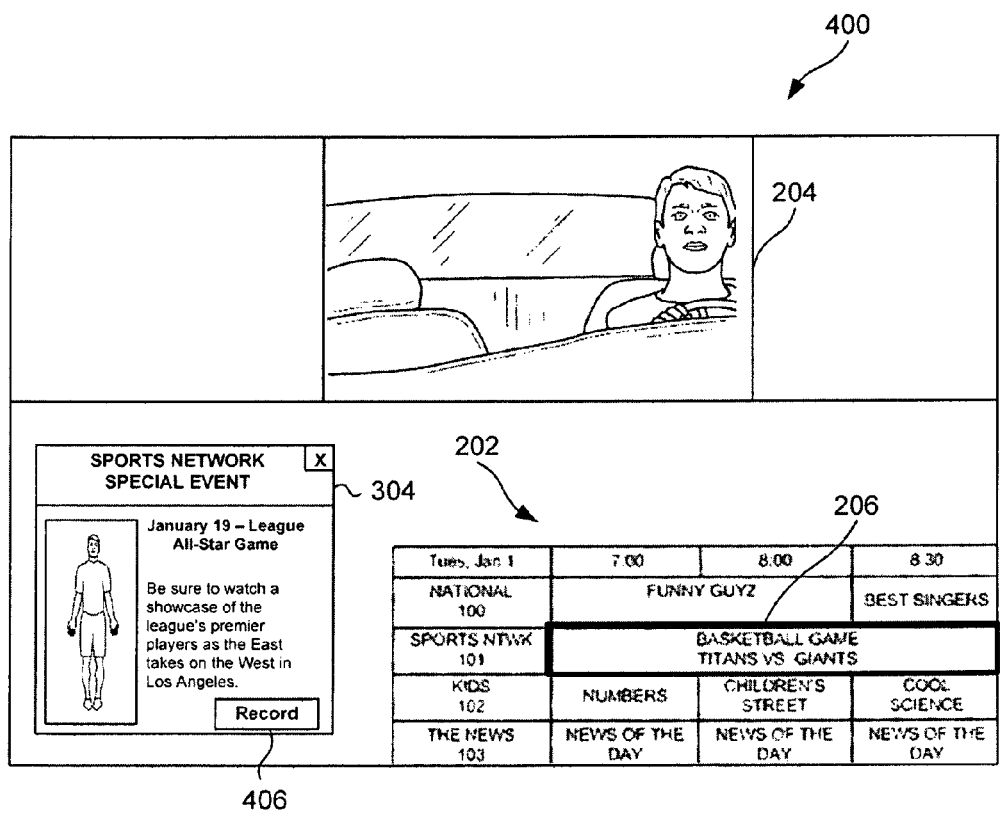
FIG. 4 illustrates a screenshot of an embodiment of a display menu outputted by the television receiver of FIG. 1.

FIG. 4 illustrates a screenshot of an embodiment of a display menu 400 outputted by the television receiver 102 of FIG. 1. The display menu 400 of FIG. 4 is similar to the display menu 300 of FIG. 3, and additionally includes a control element 406 (represented as a record button) which is associated with recording of an upcoming event. The control element 406 is displayed with the supplemental content 304. The user 108 may provide user input, via the control element 406, requesting to record the upcoming event. The television receiver 102 responsively sets a recording timer for the upcoming event responsive to the user input and records the upcoming event at the time designated by the recording timer.

In at least one embodiment, the user 108 may select the Sports Network 101 cell to view supplemental content 304 related to the network. Thus, a general advertisement or other information related to the television network may be presented in the supplemental content 304 panel. In some embodiments, the supplemental content 304 presented for a particular channel may be identified based partially on characteristics of the particular program selected as well as the particular channel. For example, if the user 108 selects a movie or television program including a particular actor, then the supplemental content 304 displayed to the user 108 may comprise an advertisement for another movie or television show including the same actor.

In at least one embodiment, the supplemental content 304 is identified by the television receiver 102 based on analyzation of the data associated with a particular cell of the electronic programming guide 202 selected by the user 108. For example, the supplemental content 304 may present advertisements for upcoming events that include the same actor(s) as a television program associated with the highlighted cell. Other characteristics may also be utilized, such as topical characteristics of television shows, e.g., food, home-improvement and cars. For example, if the user 108 selects a cell of the electronic programming guide 202 related to a cooking show, then the supplemental content 304 may display advertisements or information related to upcoming cooking shows. In at least one embodiment, the identification process is utilized to provide advertisements or previews for programs on other unrelated networks. For example, if the user selects a program on network A that includes actor A, then the supplemental content 304 may present an advertisement for an upcoming movie including actor A on unrelated network B.

Figure 5:
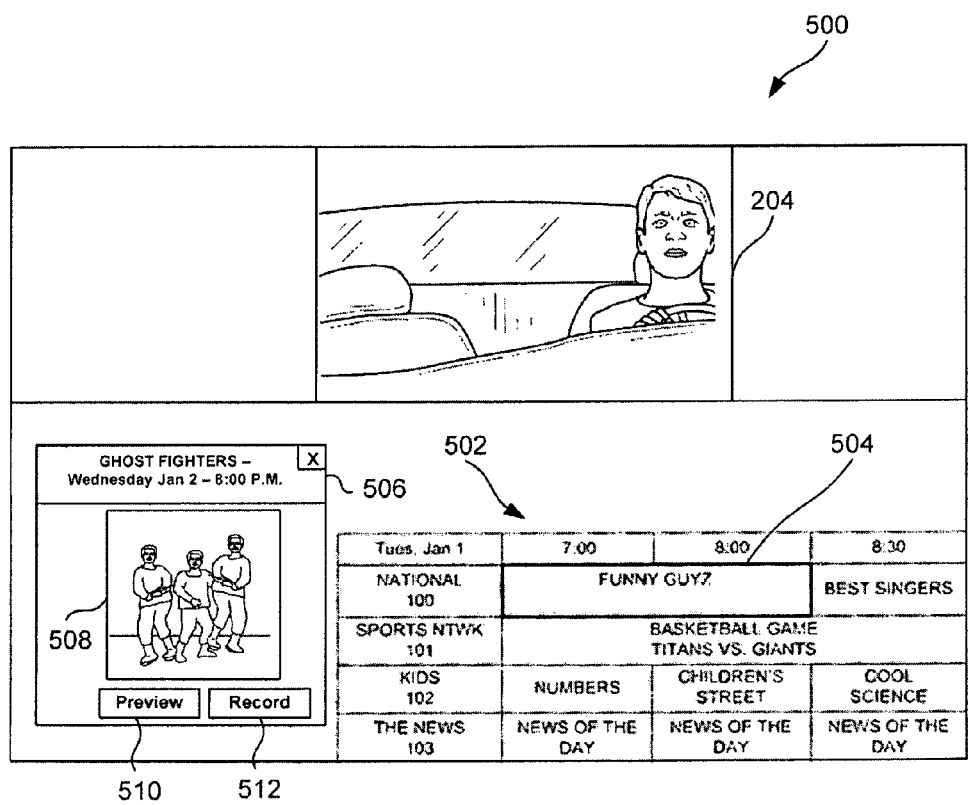
FIG. 5 illustrates an embodiment of a screenshot of a display menu outputted by the television receiver of FIG. 5.

In at least one embodiment, the supplemental content 304 may include a video preview regarding an upcoming event. FIG. 5 illustrates an embodiment of a screenshot of a display menu 500 outputted by the television receiver 102 of FIG. 5. The display menu 500 is similar to the display menus 300 and 400 described above, and includes a video output 204, an electronic programming guide 502 and supplemental content 506.

In the illustrated display menu 500, the user 108 selects cell 504 of the electronic programming guide 502. Responsively, the television receiver 102 displays the supplemental content 506 in the display menu 500. In the illustrated embodiment, the supplemental content 506 includes an advertisement for an upcoming movie on the same channel. Additionally, the supplemental content 506 includes a video preview 508 for the upcoming event. To initiate playback of the video preview 508, the user 108 may actuate the preview button 510. The user 108 may also set a recording timer for the event by actuating the record button 512.

The video preview 508 may be stored locally on the television receiver 102 prior to presentation of the supplemental content 506. For example, a video provider may transmit video preview data to a television receiver 102 in association with electronic programming guide data. The television receiver 102 may store the video previews for on-demand viewing by a user 108. In other embodiments, the television receiver 102 may query an external server for the video preview data responsive to actuation of the preview button 510 by the user 108.

Figure 6:
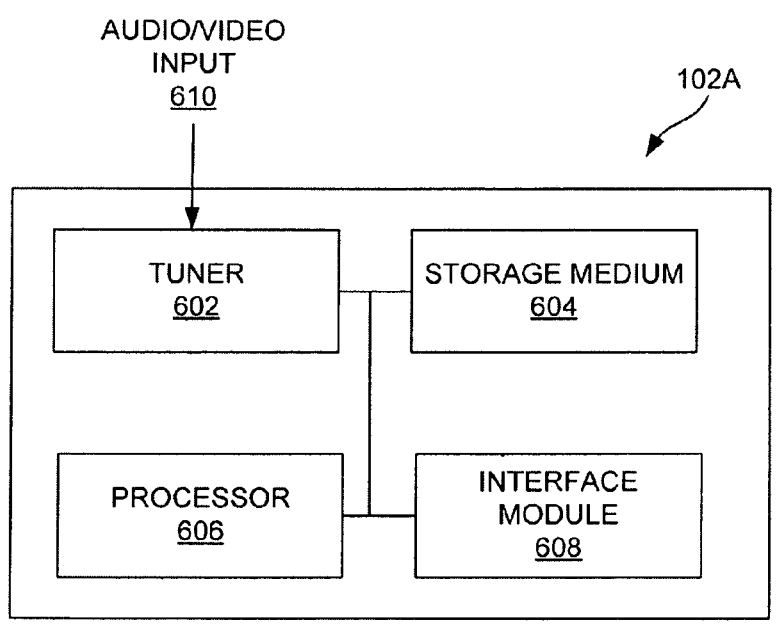
FIG. 6 illustrates an embodiment of a television receiver of FIG. 1.

FIG. 6 illustrates an embodiment of a television receiver of FIG. 1. FIG. 6 will be discussed in reference to the entertainment system 100 illustrated in FIG. 1. The television receiver 102A includes a tuner 602, a storage medium 604, a processor 606 and an interface module 608. Each of these components will be discussed in greater detail below. The television receiver 102A may include other elements, components or devices which are not illustrated for the sake of brevity.

The tuner 602 is operable to receive an audio/video input 610 from a content source. More particularly, the tuner 602 receives and tunes a television signal including television programming. The tuner 602 may receive an over-the-air broadcast, a direct broadcast satellite signal, a cable television signal or an internet protocol television (IPTV) signal and tune the audio/video input 610 to extract the selected television programming. In at least one embodiment, the television receiver 102A may include multiple tuners 602, utilized by the user 108, to view and/or record multiple television programs simultaneously.

The storage medium 604 is operable to store electronic programming guide data and other system information utilized by the television receiver 102A. The storage medium 604 may comprise any type of non-volatile memory appropriate for storing video signals recorded by the television receiver 102A. Exemplary storage mediums 604 include semi-conductor memory, hard drives (e.g., magnetic memory) and flash memory. In some embodiments, the television receiver 102A may optionally include DVR functionality to record and persistently store video signals received by the television receiver 102A. For example, the storage medium 604 may include a hard drive for storing video signals. In at least one embodiment, the storage medium 604 may be utilized to store video previews, advertising information and the like for on-demand viewing by the user 108. In some embodiments, a hard drive or other storage medium may be internally located within the television receiver 102A. In other embodiments, a hard drive or other storage medium may be located external with respect to the television receiver 102A. The television receiver 107A may also utilize a combination of internal and external storage mediums 604 for storage of video signals and other data.

The processor 606 is operable to control the operation of the television receiver 102A. The processor 606 may be a single processing device or a plurality of processing devices that cooperatively operate to control the operation of the television receiver 102A. The processor 606 may include various components or modules for processing and outputting audio/video content. Exemplary components or modules for processing audio/video content include a demodulator, a decoder, a decompressor, a conditional access module and a transcoder module.

The processor 606 is operable to receive the audio/video input stream 610, received via the tuner 602, and generate an audio/video output stream based on the audio/video input 610 for display by an associated display device 104. An audio/video output stream is outputted to the display device 104 (see FIG. 1) for presentation to the user 108. The processor 606 may incorporate circuitry to output the audio/video streams in any format recognizable by the display device 104, including composite video, component video, Digital Visual Interface (DVI) and High-Definition Multimedia Interface (HDMI). The processor 606 may also incorporate circuitry to support multiple types of these or other audio/video formats. In at least one embodiment, as described above, the television receiver 102A may be integrated with the display device 104, and the processor 606 may be operable to control the presentation of the audio/video output stream. In at least one embodiment, the processor 606 is operable to coordinate storage of the audio/video input 610 onto the storage medium 604. The processor 606 is also operable to retrieve stored video content to generate an audio/video output stream for display by the display device 104. To coordinate the storage of the audio/video input 610, the processor 606 is operable to receive user input requesting to record one or more television programs. Responsively, the processor 606 sets recording timers for the indicated television programs.

The interface module 608 is operable to wirelessly receive data from the remote control 106. The interface module 608 may communicate with the remote control 106 utilizing any type of IR or RF communication link. In at least one embodiment, the interface module 608 receives a key code from the remote control 106, and responsively provides the key code to the processor 606. In some embodiments, the interface module 608 may receive positional information from a scrolling device of the remote control 106, e.g., a touch pad, scroll wheel or the like. Some of the data received by the interface module 608 may request to view electronic programming guide data and the like.

The processor 606 is operable to receive user input requesting to display an electronic programming guide. Responsive to the user input, the processor 606 outputs a display menu, for display by the display device 104, that includes the electronic programming guide data. More particularly, the programming guide data is displayed in first and second portions of the display menu. FIG. 2 illustrates one exemplar embodiment of the display menu 200 initially outputted by the processor 606.

After outputting a programming guide for display to the user 108, the processor 606 receives user input selecting a region of the programming guide. In other words, the user 108 may highlight a cell of the programming guide corresponding with a particular channel or program listed in the programming guide. The processor 606 processes the user input to identify supplemental content for display by the display device 104. In at least one embodiment, the supplemental content is identified by the processor 606 based on the region of the programming guide selected by the user, e.g., the particular channel or program selected by the user. The processor 606 then outputs simultaneously, for display in the display menu, supplemental content in the first portion of the display menu and the programming guide in the second portion of the display menu. If the user 108 provides input requesting to exit the supplemental content, then the processor 606 responsively outputs the programming guide in the first and second portions of the display menu, returning the programming guide to its original size.

Those of ordinary skill in the art will appreciate that the various functional elements 602 through 608 shown as operable within the television receiver 102A may be combined into fewer discrete elements or may be broken up into a larger number of discrete functional elements as a matter of design choice. Thus, the particular functional decomposition suggested by FIG. 6 is intended merely as exemplary of one possible functional decomposition of elements within the television receiver 102A.

Figure 7:
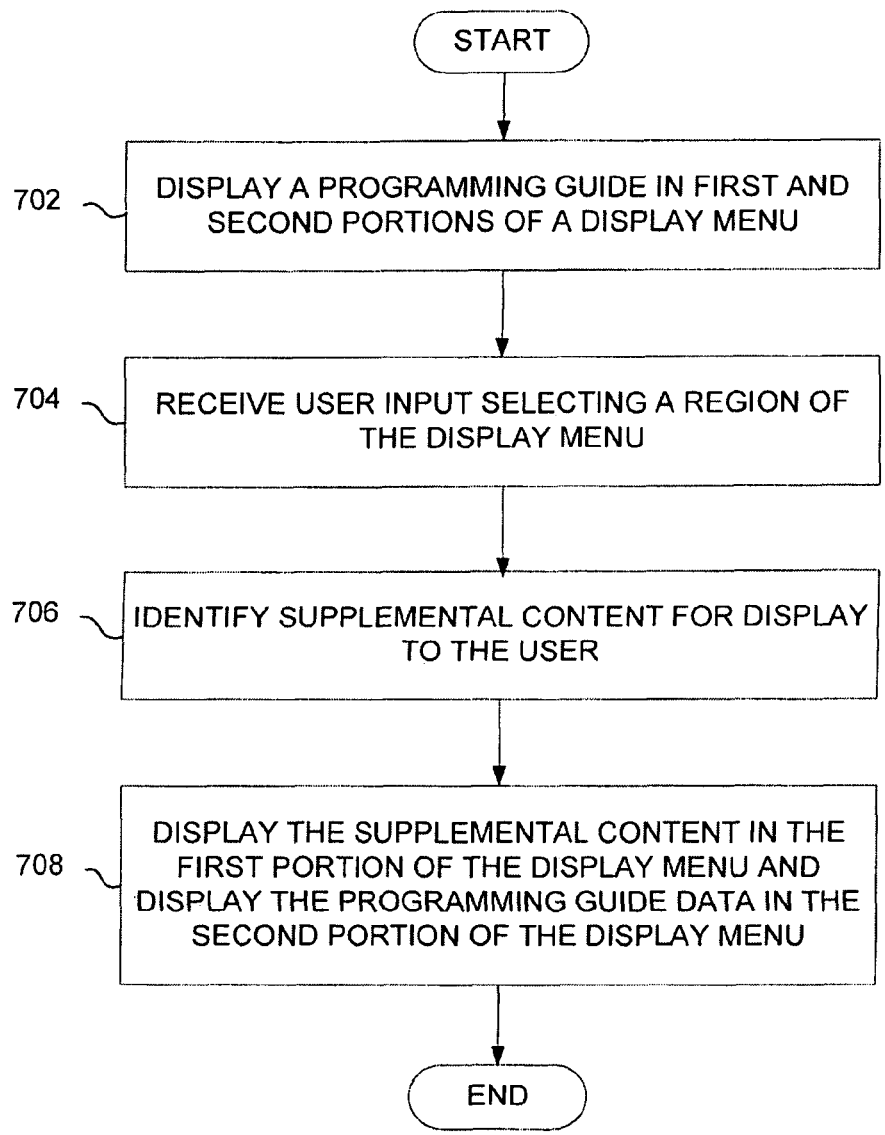
FIG. 7 illustrates an embodiment of a process for displaying television guide information.

FIG. 7 illustrates an embodiment of a process for displaying television guide information. More particularly, FIG. 7 illustrates an embodiment of a process for displaying supplemental content associated with electronic programming guide data. The process of FIG. 7 may include other operations not illustrated for the sake of brevity.

The process includes displaying a programming guide in first and second portions of the display menu (operation 702). In at least one embodiment, the first and second portions of the display menu comprise a single panel of a display menu. The panel may be positioned in any region of the display menu and may be any appropriate size depending on desired design criteria. The programming guide may be displayed in association with other data in the display menu, such as a video output of presently viewed programming.

The process further includes receiving user input selecting a region of the programming guide (operation 704). For example, a user may select a particular cell of the programming guide, selecting a program or channel of the programming guide. The process further includes identifying supplemental content for display to the user (operation 706). In at least one embodiment, the supplemental content is identified based on characteristics of the region of the programming guide selected by the user.

The process farther includes displaying supplemental content in the first portion of the display menu responsive to the user input and simultaneously displaying the programming guide in the second portion of the display menu (operation 708). Thus, the programming guide data is resized to accommodate the display of the supplemental content. In at least one embodiment, the programming guide data is presented in a first panel of the display menu and the programming guide data is presented in a second display menu. Thus, the user is presented with supplemental information, e.g., advertisements for upcoming programming, on-demand simultaneously with the programming guide data.

Although specific embodiments were described herein, the scope of the invention is not limited to those specific embodiments. The scope of the invention is defined by the following claims and any equivalents therein.

We claim:

1. A method for displaying television guide information, the method comprising:

initially displaying a programming guide grid that provides information about a plurality of television programs in a programming guide window, the programming guide grid comprising a first row comprising a plurality of time slots and a first column comprising the plurality of television programs, where each television program of the plurality of television programs in the first column is associated with one time slot of the plurality of time slots in the first row;

initially displaying live television programming content adjacent to the programming guide grid;

receiving a user input selecting a region of the programming guide grid within the first column corresponding to a particular television program of the plurality of television programs; and in response to receiving the user input, displaying supplemental content corresponding to the particular television program in a supplemental content window within a smaller portion of the programming guide window that was previously occupied by the programming guide grid while simultaneously resizing the programming guide grid so that a re-sized programming guide grid that is smaller than the previous programming guide but that provides all of the same information about the plurality of television programs as the previous programming guide grid is displayed in a portion of the programming guide window next to the supplemental content during display of the television guide information, wherein the combined space occupied by the supplemental content window and the re-sized programming guide grid is smaller than the previous programming guide grid, wherein the supplemental content window comprises:

1) an advertisement for an upcoming event related to the particular television program;

2) a video preview icon, wherein a user input selecting the video preview icon causes a video regarding the upcoming event to be played in the supplemental content window; and 3) a trigger control element associated with recording of the upcoming event, wherein a user input selecting the trigger control element causes the setting of a recording timer for recording the upcoming event, responsive to the user input.

2. The method of claim 1, further comprising:

receiving a second user input requesting to exit the supplemental content; and again displaying the programming guide grid in a manner that spans the entire programming grid window, responsive to the second user input.

3. The method of claim 1, wherein displaying the supplemental content further comprises:
identifying the supplemental content based on the particular television program selected in the programming guide.

4. The method of claim 1, wherein the region of the programming guide corresponds with a particular television channel, and wherein displaying the supplemental content further comprises:
identifying the supplemental content based on the particular television channel selected in the programming guide.

5. A television receiver comprising:
a tuner that receives television programming from a programming source;
an input interface communicatively coupled to an input device; and
a processor configured to:
output a display menu, for display by an associated display device, the display menu including a programming guide that spans both first and second portions of the display menu and that provides information about a plurality of television programs in a grid format, the programming guide grid comprising a first row comprising a plurality of time slots and a first column comprising the plurality of television programs, where each television program of the plurality of television programs in the first column is associated with one time slot of the plurality of time slots in the first row;
output live television programming content adjacent to the programming guide grid
process user input, received from the input device via the input interface, the user input selecting a region of the programming guide within the first column corresponding to a particular one of the plurality of television programs;
identify supplemental content associated with the particular television program for display in the display menu based on the region of the programming guide selected by the user; and
output simultaneously, for display in the display menu, a supplemental content window comprising supplemental content in an area that is smaller than the first portion of the display menu and a re-sized programming guide in a grid format that contains all of the same information about the plurality of television programs as the previous programming guide, but that is shrunken to fit in only in an area that is smaller than the second portion of the display menu next to the display of the supplemental content associated with the particular television program during display of the electronic programming guide, wherein the combined space occupied by the supplemental content window and the re-sized programming guide grid is smaller than the previous programming guide grid, wherein the supplemental content window comprises:
1) an advertisement for an upcoming event related to the particular television program;
2) a video preview icon, wherein a user input selecting the video preview icon causes a video regarding the upcoming event to be played in the supplemental content window; and
3) a trigger control element associated with recording of the upcoming event, wherein a user input selecting the trigger control element causes the setting of a recording timer for recording the upcoming event, responsive to the user input.

6. The television receiver of claim 5, wherein:
the input interface receives second user input from the input device, the second user input requesting to exit the supplemental content; and
the processor again outputs the programming guide in a manner that spans both the first and the second portions of the display menu, responsive to the second user input.

7. The television receiver of claim 5, wherein the processor identifies the supplemental content based on the particular television program selected in the programming guide.

8. The television receiver of claim 5, wherein the processor identifies the supplemental content based on the particular television channel selected in the programming guide.

9. The television receiver of claim 5 further comprising: a storage medium that stores the video preview prior to reception of the user input.

10. The method of claim 1 wherein the resizing comprises shrinking the programming guide grid so that the same information previously displayed in the program guide window is presented as the re-sized programming guide grid within only the smaller portion of the programming guide window.

11. A method for displaying television guide information, the method comprising:
initially displaying a television program on a display device;
receiving a first user input indicating a request to display an electronic programming guide;
in response to receiving the first user input, displaying the television program and the electronic programming guide simultaneously on the display device, wherein the electronic programming guide is displayed as a programming guide grid that provides information about a plurality of television programs in a programming guide window on the display device, the programming guide grid comprising a first row comprising a plurality of time slots and a first column comprising the plurality of television programs, where each television program of the plurality of television programs in the first column is associated with one time slot of the plurality of time slots in the first row, and wherein supplemental content regarding the television program is excluded from display on the display device;
receiving a second user input selecting a region of the programming guide grid within the first column corresponding to a particular television program of the plurality of television programs;
in response to receiving the second user input, displaying a supplemental content window comprising supplemental content corresponding to the particular television program within a smaller portion of the programming guide window that was previously occupied by the programming guide grid while simultaneously continuing to display the television program and resizing the programming guide grid so that a re-sized programming guide grid that is smaller than the previous programming guide but that provides all of the same information about the plurality of television programs as the previous programming guide grid is displayed in the remainder of the programming guide window next to the supplemental content during display of the television guide information, wherein the combined space occupied by the supplemental content window and the re-sized programming guide grid is smaller than the previous programming guide grid, wherein the supplemental content window comprises:

1) an advertisement for an upcoming event related to the particular television program;
2) a video preview icon, wherein a user input selecting the video preview icon causes a video regarding the upcoming event to be played in the supplemental content window; and
3) a trigger control element associated with recording of the upcoming event, wherein a user input selecting the trigger control element causes the setting of a recording timer for recording the upcoming event, responsive to the user input;

receiving a third user input selecting the video preview icon;

in response to the third user input, playing within the supplemental content window a preview video regarding the upcoming event;

receiving a fourth user input selecting the trigger control element;

in response to the fourth user input, setting a recording timer for recording the upcoming event and recording the upcoming event according to the recording timer;

receiving a fifth user input requesting to exit the supplemental content; and in response to the fifth user input, discontinuing the display of any supplemental content on the display device while continuing to display the programming guide grid and the television program.

12. The method of claim 11, wherein the preview video had been previously locally received and stored prior to receiving the third user input.

13. The method of claim 11, wherein in further response to receiving the third user input, querying a remote server for data comprising the preview video and receiving the data from the remote server.

14. The method of claim 13, further comprising receiving a sixth user input requesting to tune to the particular television program; and in response to the sixth user input, tuning to the particular television program and displaying the particular television program on the display device in place of the initially displayed television program.

\* \* \* \* \*